Feb. 13, 1951 B. E. HOUSE 2,541,253
BRAKE SHOE
Filed July 31, 1944 2 Sheets-Sheet 1

INVENTOR
BRYAN E. HOUSE
BY
T. J. Plante
ATTORNEY

Feb. 13, 1951     B. E. HOUSE     2,541,253
BRAKE SHOE

Filed July 31, 1944     2 Sheets-Sheet 2

INVENTOR
BRYAN E. HOUSE
BY T. J. Plante
ATTORNEY

Patented Feb. 13, 1951

2,541,253

UNITED STATES PATENT OFFICE 2,541,253

BRAKE SHOE

Bryan E. House, South Bend, Ind., assignor to Bendix Aviation Corporation, South Bend, Ind., a corporation of Delaware Application July 31, 1944, Serial No. 547,356

2 Claims. (Cl. 188—250)

This invention relates to the construction of brake shoes.

An object of the invention is to provide an improved brake shoe construction and method for making the same which will permit the use of less expensive equipment in the manufacture of the shoes, the proposed shoe construction being intended to take the place of the conventional welded shoe, in the making of which the web is secured to the rim by means of arc welding.

Other objects and advantages of the present invention will become apparent during the course of the following description, reference being had therein to the accompanying drawings, in which.

Figure 9:
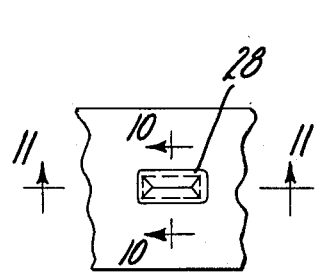
Figure 9 is a plan view of a portion of the finished shoe.
Figure 10:
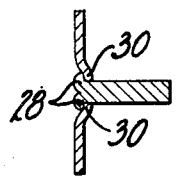
Figure 11:
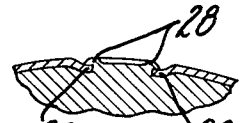

Figures 10 and 11 are sections taken on the lines 10—10 and 11—11 respectively of Figure 9.

Figure 1:
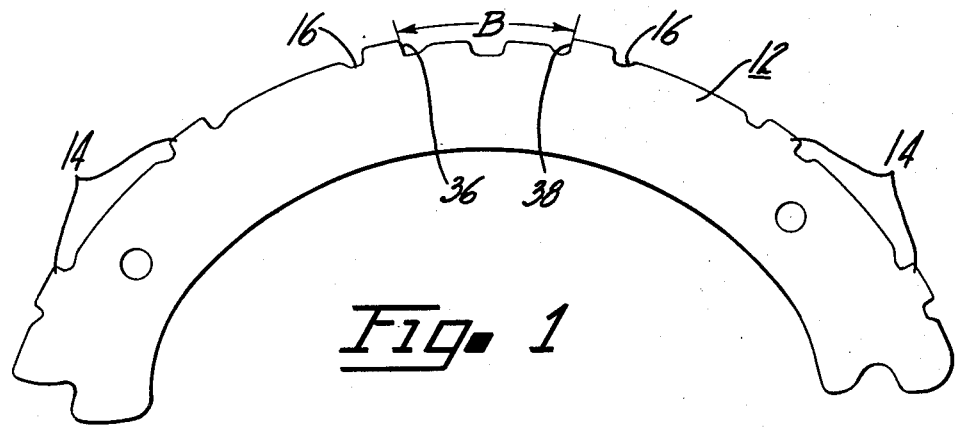
Figure 1 shows a brake shoe web prior to assembly into the complete shoe.

Referring to Figure 1, a brake shoe web 12, which may conveniently be formed by stamping, is shown. This web is provided with a plurality of integral projections 14 extending substantially radially outwardly from the circumference of the web, the number of projections being a matter of choice. Preferably indentations 16 are formed at each side of each projection, although this is not entirely necessary.

Figure 2:
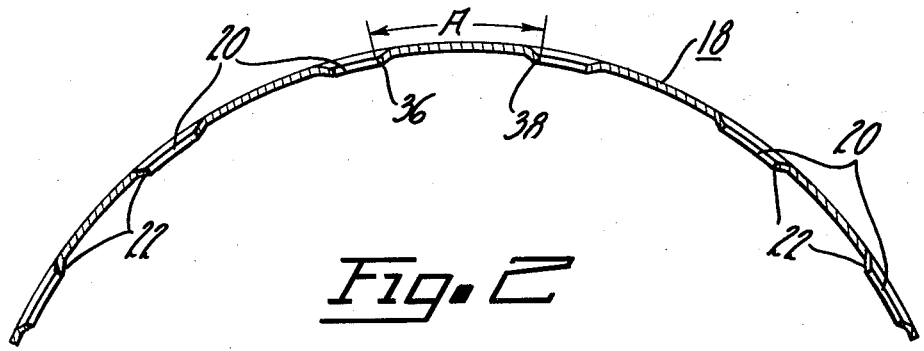
Figure 2 is a section through a brake shoe rim, also prior to assembly of the complete shoe.
Figure 3:
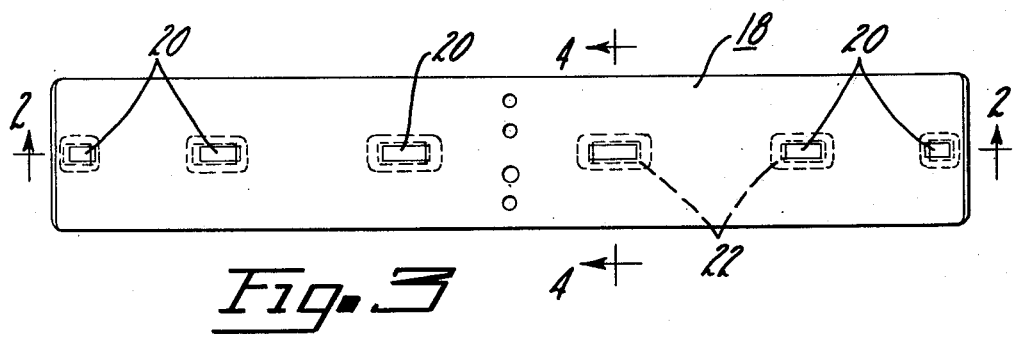
Figure 3 is a plan view of the rim shown in Figure 2.
Figure 4:
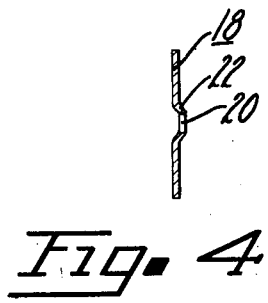
Figure 4 is a section taken on the line 4—4 of Figure 3.

The shoe rim 18, which is shown in Figures 2 to 4 inclusive, is shaped to conform substantially to the outer arcuate edge of the web 12. A plurality of slots 20 are cut through the rim, corresponding to the integral projections 14 on the web. Although the rim may be formed in any desired manner, it is probably preferable to first cut it to the desired length from flat sheet stock, then punch the required number of slots therethrough, and finally roll the rim to the arcuate shape required. Preferably, although not necessarily, the surface of the rim around each slot is depressed as shown at 22, for a reason which will shortly become apparent.

Figure 5:
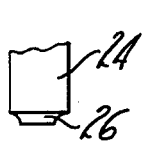
Figures 5, 6 and 7 are front, end and side views, respectively, of a tool which may be used during assembling of the shoe.
Figure 6:
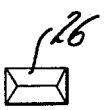
Figure 7:

After the rim 18 and web 12 have been assembled together, the several rim projections are struck or punched to securely tack the parts together, the web projections being simultaneously spread and flattened during the striking or punching operation. Any one of several types of tools may be used during this striking or punching operation. For purposes of illustration, I have shown in Figures 5, 6 and 7 front, end and side views, respectively, of a tool 24 which will serve the purpose. The working edge 26 of this tool is so constructed as to spread or force some of the metal of the web projection in each direction, thus causing the edge 28 of each of the web projections to overlie the adjacent edge 30 of the rim slot, as seen particularly in Figures 9 to 11, the edge 28, in effect, serving the purpose of a rivet.

Figure 8:
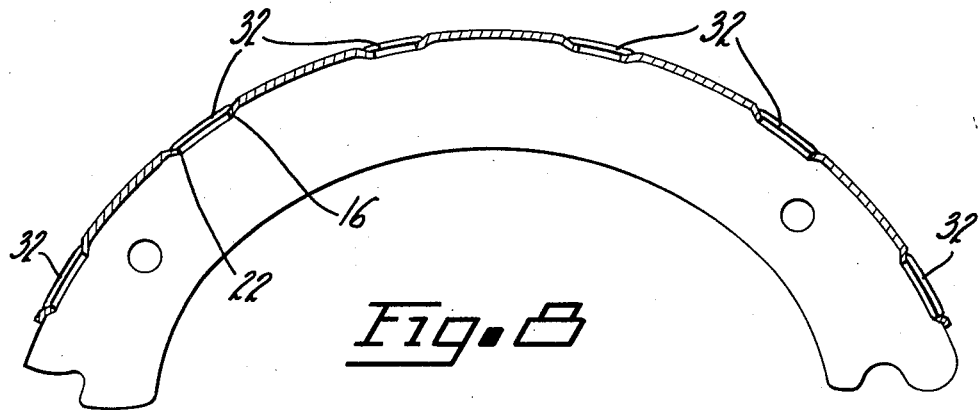
Figure 8 is a part sectional side elevation showing the finished shoe.

Figure 8 shows the completed brake shoe, wherein, due to the depressions 22 in the rim and the indentations 16 in the web, the outer flattened surfaces 32 of the web projections lie substantially flush with or below the outer arcuate surface 34 of the rim, thereby providing an even surface for the shoe lining.

Because the shoe rim 18 has to be slipped over the projections on the shoe web, the slots 20 in the rim must be sufficiently long to clear both edges of the projections. The slots which first slide over the projections may be substantially the same length as the projections, but those slots which are angularly spaced from the former slots must be somewhat longer than the projections. "Longer" refers to the circumferential dimension. Thus, assuming that the rim is to be moved toward the web during assembly on a line which substantially bisects the rim and the web lengthwise, the slots nearer the opposite ends of the rim will have to have a greater circumferential dimension than those nearest the center of the shoe.

Because of the clearance which must be allowed between certain of the slots and the respective web projections, it is necessary that the edges of the slots closely fit the edges of the projections at at least two points, in order to prevent circumferential movement of the rim relative to the web due to the braking torque. One of the points at which there is a close fit must be arranged to take the torque in one direction of rotation, and the other must be arranged to take it in the opposite direction of rotation. In the illustration, I hold the dimension A of the rim to an extremely close tolerance relative to the dimension B of the web. Therefore, the edges of the rim slots will be in close contact with the edges of the web projections at the points 36 and 38.

This result might also be accomplished by having a single projection and slot at or near the center of the shoe, or at one end of the shoe, and holding the length of the slot to a very close tolerance with respect to the length of the projection.

The invention herein described makes it possible to construct a strong and efficient brake shoe by means of a relatively rapid and inexpensive process.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. A brake shoe comprising an arcuate rim having a plurality of slots therethrough, and a stamped web normal to the rim having a plurality of integral projections extending through the slots, said projections having flattened and spread outer ends which serve as rivet heads securing the rim to the web, the projections midlength of the web being coextensive in length with the corresponding slots in the rim, and said projections at the ends of said web being of lesser length than the corresponding slots in said rim in order that the edges of said slots will clear said projections when said rim is radially assembled to the web.

2. A brake shoe comprising an arcuate rim having a plurality of slots therethrough, and a stamped web normal to the rim having a plurality of integral projections extending through the slots, said projections having flattened and spread outer ends which serve as rivet heads securing the rim to the web, the projections midlength of the web being coextensive in length with the corresponding slots in the rim, and said projections at the ends of said web being of lesser length than the corresponding slots in said rim in order that the edges of said slots will clear said projections when said rim is radially assembled to the web, one edge of one projection being in close contact with one edge of one slot to prevent rotation of the rim relative to the web in one direction, and an opposite edge of one projection being in contact with an opposite edge of one slot to prevent rotation of the rim relative to the web in the other direction.

BRYAN E. HOUSE.

REFERENCES CITED

The following references are of record in the file of this patent:

UNITED STATES PATENTS

| Number | Name | Date |
| --- | --- | --- |
| 1,659,368 | Long | Feb. 14, 1928 |
| 1,818,090 | Peterson | Aug. 11, 1931 |
| 1,826,283 | Mooers | Oct. 6, 1931 |
| 1,909,256 | Emmord | May 16, 1933 |
| 1,954,524 | Goepfrich | Apr. 10, 1934 |
| 2,022,328 | Trask | Nov. 26, 1935 |
| 2,291,525 | Bessey | July 28, 1942 |